United States Patent [19]

Milošević

[11] 4,013,156

[45] Mar. 22, 1977

[54] CENTRIFUGAL CLUTCH

[75] Inventor: Romeo Milošević, Koper, Yugoslavia

[73] Assignee: Tovarna motornih vozil TOMOS, Koper, Yugoslavia

[22] Filed: July 29, 1974

[21] Appl. No.: 492,872

[30] Foreign Application Priority Data

July 30, 1973 Yugoslavia .................. 2061/73

[52] U.S. Cl. ........................................ 192/105 BA
[51] Int. Cl.² ........................................ F16D 43/24
[58] Field of Search ............ 192/105 BA, 105 BB, 192/105 CD, 105 CE

[56] References Cited

UNITED STATES PATENTS

| 1,841,613 | 1/1932 | Libby | 192/105 BA |
| 2,610,718 | 9/1952 | Chapman | 192/105 BA X |
| 2,703,163 | 3/1955 | Millar | 192/105 BA |
| 2,732,051 | 1/1956 | Dalrymple | 192/105 BA |
| 2,851,893 | 9/1958 | Putz | 192/105 BA |

FOREIGN PATENTS OR APPLICATIONS

| 23,968 | 10/1907 | United Kingdom | 192/105 BA |
| 584,470 | 1/1947 | United Kingdom | 192/105 BA |

*Primary Examiner*—Samuel Scott
*Assistant Examiner*—Lance W. Chandler
*Attorney, Agent, or Firm*—Karl F. Ross; Herbert Dubno

[57] ABSTRACT

A centrifugal clutch has its segments formed with beveled shoulders engaged by the continuous periphery of a cup spring. The prestress on the latter is defined by the thickness of a washer interposed between this cup spring and the hub which carries the segments via arms received in grooves of the segments. The segments are formed with plugs extending into slots of the arms and limiting the radial displacement relative thereto.

1 Claim, 3 Drawing Figures

CENTRIFUGAL CLUTCH

The object of the invention is to provide a centrifugal clutch with radially shiftable mass segments, located on the driving part of the clutch, which mass segments move apart at a determined number of revolutions and, by means of friction against the drum of the driven part of the clutch, transmit torque. The segments are held in their internal position by an axially arranged cup spring and are simultaneously pushed by this cup-spring onto their guides by means of its frustoconical outer rim which rests against the edge of the segments. The friction upon the segments at the surfaces engaged by the spring prevents the vibration of the segments and brakes their movement in such a manner that coupling is carried out at a considerably higher number of revolutions than the uncoupling of the centrifugal clutch.

Centrifugal clutches are known which utilize friction for the purpose of damping vibration and increasing the difference between the angular velocity at coupling and at upcoupling. The known clutches of this kind have special friction elements for this purpose. The friction elements are constructed either as friction plates against which the segments slide upon their radial movement or as friction bushings built into the bores of two adjacent elements. Upon the movement of the segments friction occurs between the bushings and the segments. As friction elements friction strips are also used and are arranged under the restoring spring which is formed as a ring. Upon the movement of segments friction develops between said strips and said segments. Clutches comprising friction elements are known from the Austrian Patent No. 229,727. The application of those friction elements and their installation results in an increase of the cost of producing the centrifugal clutches. An object of the invention is to attain the desired difference between the angular velocity at coupling and those at uncoupling of the centrifugal clutch and to prevent vibration of the segments at the coupling and uncoupling of the clutch, and to improve the design by means of a simplified arrangement without the use of special friction elements.

This object is achieved according to the invention by using, as the spring element of the clutch an axially located cup spring which has a tapered or frustoconical outer rim which holds the coupling segments in the uncoupled position and presses them simultaneously against the appertaining guides, thereby assuring the necessary friction force to prevent the vibration of the segments and to attain the desired difference between the angular velocity at coupling and at uncoupling.

The embodiment according to the invention is represented in the attached drawing in which FIG. 1 shows a cross section of the centrifugal clutch with a cup spring having a tapered outer rim and with a clutch drum along the line I-I of FIG. 2;

Figure 2:
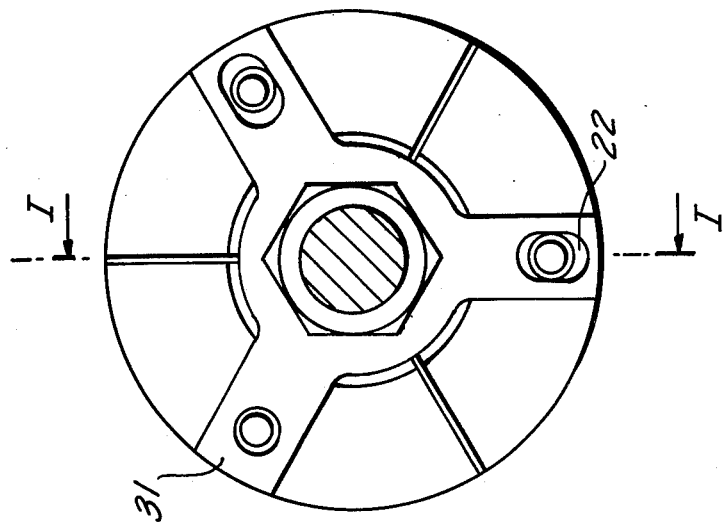
FIG. 2 shows a side view off the driving part of the clutch from FIG. 1.
Figure 1:
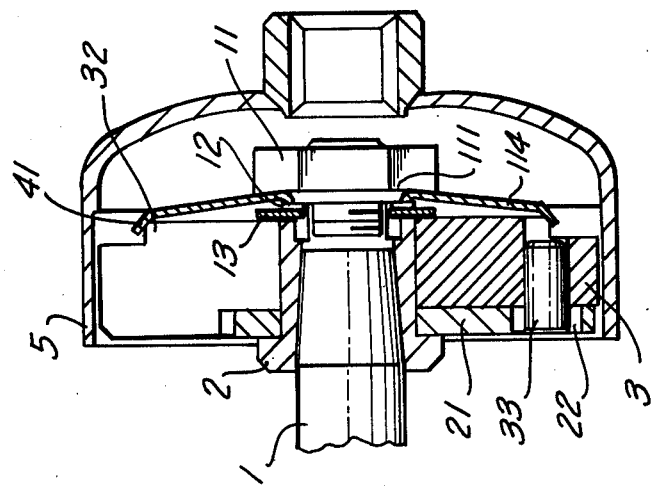

The centrifugal clutch as shown in FIG. 1 and 2 comprises a hub 2 provided with guiding legs 21, which is mounted on the tapered end of a driving shaft 1 by means of a nut 11, a washer 12 for the adjustment of the prestress of a spring 4 and a guiding washer 13. The engaging segments 3 provided with side grooves 31 rest upon the guiding legs 21 against which they are pressed by means of the axially arranged prestressed cup spring 4 provided with a tapered or frustoconial outer rim 41. Said tapered rim leans against the narrow beveled surface of the edges 32 of said engaging segments 3, while the inner part of the spring is seated on the shoulder 111 of the nut 11. The plugs 33 which are firmly attached to the segments 3 extend into the recesses or slots 22 provided for the limitation of the movement of said segments, which recesses are formed in the guiding legs 21. When the clutch is engaged, the centrifugal force presses the engaging segments 3 against the drum 5 of the clutch which is carried by a driven shaft not shown in the drawings.

Due to the slope of the tapered outer rim 41 of the cup spring 4, the force of the spring is divided at the edge 32 of the segment 3 into an axial component pressing the segments against the guiding legs 21 and into a radial component pressing the segments towards the center of the clutch into their disengaged positions. The axial component of the spring tension causes a friction force at the surfaces on which the segments lean, which friction force is proportional to the orthogonal pressure and to the coefficient of friction between the surfaces in contact and hinders the movement of segments on said guiding legs. When the number of revolutions per minute increases to such an extent that the centrifugal force overcomes the radial component due to the spring tension and the friction force of the segments, the segments begin to move outwards.

The coefficient of friction during the movement being smaller than said coefficient of friction during the resting period of the segments, the friction force on the leaning surfaces diminishes suddenly during the movement of said segments. Due to this, balance between forces is destroyed and the segments quickly move outwards until they bear upon the internal circumference of the drum 5. The surplus of the centrifugal force forces the segments against the drum in such a way that the clutch begins immediately to transmit a certain minimal torque. For the disengagement of the clutch, the angular velocity is reduced until the radial component of the spring tension overcomes the centrifugal force and the friction force on the bearing surfaces of segments 3 during the resting period of the segments.

By means of friction between the spring, the segments and the guiding legs, which friction force acts opposite to the direction of the movement of segments, the desired difference between the angular velocity for coupling of the clutch and that for the uncoupled clutch is attained. This further renders possible a quick coupling and uncoupling of the clutch and also a shorter slippage phase of the clutch. The above-mentioned friction also prevents the vibration of segments which may occur at the coupling and uncoupling of the clutch.

Figure 3:
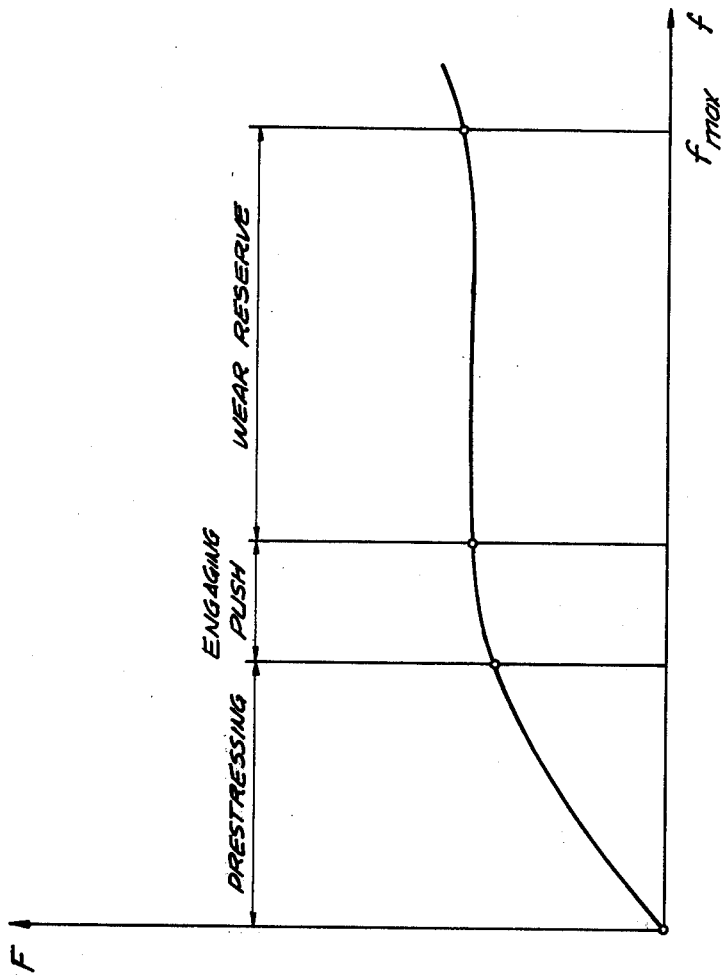
FIG. 3 is a diagram which shows the characteristics of the cup spring with a tapered outer rim.

FIG. 3 is a diagram of force (F) plotted along the ordinate in dependence of the deformation (f) on the abscissa of the cup spring provided with a tapered outer rim which is used in the embodiment of the clutch according to the invention. It is characteristic for such a spring having an appropriately chosen geometry that it has a relatively vast range of deformation in which the tension of the spring remains approximately constant. From the entire allowable deformation ($f_{max}$) which is limited by the endurance limit of stress of said spring, approximately 25% is utilised for the pretension of the spring and 15% for the engaging push of the segments in a new, not worn out clutch. The remaining 60% of deformation serves as a reserve which makes possible a wearing out of the surfaces of the segments for approx. 2% without an essential influence on the function of the clutch. The relatively quick increase of the force in the region of small deformations requires a precise adjusting of the prestress, which can be attained by choosing an appropriate thickness of the washer 12.

The guiding washer 13 in association with the limiting recesses 22 at guiding legs 21 and the plug 33 at the engaging segments prevent the dumping and falling out of the segments, in case the driving motor with the driven part of the clutch has been started without a load provided with the drum of the clutch. This is most important as a safety measure with so-called "combined" machines where the driving motor is simply transferred to different working machines and where by someone not skilled the motor could be started without the connection to the working machine.

What I claim is:

1. A centrifugal clutch comprising:
   a driving member;
   a hub mounted upon said driving member and rotatable thereby, said hub being formed with a plurality of annularly spaced radially extending arms;
   a respective engaging segment radially displaceably carried by each of said arms, said segments each being formed on one axial side with a radial groove slidably receiving the respective arm and, on the opposite axial side with an arc-segmental shoulder formed with a narrow bevel;
   an annular cup spring mounted on said driving member and having a frustoconical central portion of a large apex angle and a continuous axial periphery formed as a frustocone of smaller apex angle slidably engaging the bevels of all of said segments and urging same radially inwardly and axially against the respective arms;
   clamping means engaging the inner periphery of said spring and securing same to said driving member;
   a drum surrounding said segments and engaged thereby upon rotation of said driving member and said hub at an annular velocity sufficient to displace said segments outwardly against the force of said spring and the friction force between said arms and said segment, each of said arms being formed with a respective radial slot and each of said segments is provided with a plug extending slidably into the respective slot and limiting radial displacement of the respective segment along the respective arm;
   a disk retained by said clamping means against said hub and forms a radial guide surface for said opposite sides of said segments; and
   a prestressing washer interposed between said disk and said inner periphery of said cup spring to impart a predetermined prestress defined by the thickness of the washer to said cup spring.

* * * * *